United States Patent Office 3,369,035
Patented Feb. 13, 1968

3,369,035
π-ALLYLIC PALLADIUM HALIDE COMPLEXES AND PREPARATION
Robert G. Schultz, Vinita Park, Mo., assignor to Monsanto Company, a corporation of Delaware
No Drawing. Filed Nov. 29, 1963, Ser. No. 327,126
11 Claims. (Cl. 260—429)

ABSTRACT OF THE DISCLOSURE

Reaction of allene with dihalo-arylcyanide palladium (II) to obtain di-μ-halo-di (β-haloalkyl)dipalladium (II) and related π-allylic complexes.

---

The present invention relates to allylic palladium complexes and a method of preparing such complexes. The novel compounds of the present invention are di-μ-halo-(β-haloallyl)-(β-(3-halo-1-propen - 2 - yl) - allyl)-dipalladium (II) and di-μ-halo-di-(β - (3-halo-1-propen-2-yl)-allyl)-dipalladium (II) and derivatives thereof in which the halo groups are replaced by hydroxyl or alkoxyl groups. The novel process of the present invention involves the reaction of allene with dichloro-bis-arylcyanide palladium (II) to obtain allyl palladium complexes, such as the foregoing complexes and di-μ-halo-di-(β-haloalkyl) dipalladium (II). The halo group in any of the foregoing names or any of the compounds or reactants employed in the present invention can be iodo, chloro or bromo groups.

The process of the present invention can be illustrated:

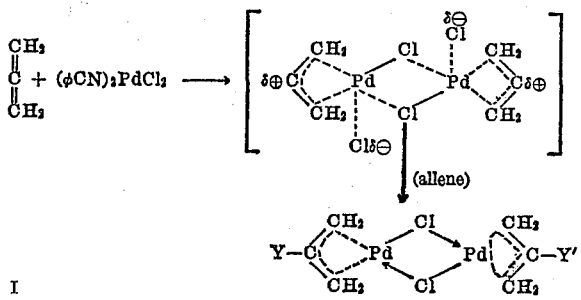

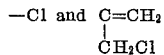

in which Y and Y' are individually selected from the group consisting of

—Cl and C=CH$_2$
|
CH$_2$Cl

The final products, as pictured in the formula, are π complexes, i.e., di-μ-chloro-di - π-(β-chloroallyl)dipalladium (II), di-μ-chloro-π-(β-chloroallyl)-π'-(β-(3-chloro-1 - propen-2-yl)allyl)dipalladium (II), and di-μ-chloro-di-π-(β-(3-chloro-1-propen-2-yl)-allyl) - dipalladium (II). The illustrated structures with π-bonding are confirmed by nuclear magnetic-resonance data in benzonitrile solution, and the π-bonding is also present in the solid form of the complexes. However, the bonds are converted to sigma (σ) bonds by dissolution in dimethylsulfoxide. When the reaction is conducted in aqueous or alcohol solution, some or all of the chloro groups can be replaced by hydroxyl or alkoxyl groups respectively. The "φ" in the above formula represents a phenyl radical.

The invention is further illustrated by the following examples.

Example 1

Palladium dichloride (PdCl$_2$·2H$_2$O) was suspended in benzonitrile, heated to 100° C., for one hour and filtered after cooling to obtain yellow crystals of dichloro bis-benzonitrile palladium (II) which were washed with petroleum ether and dried in a vacuum over at 50° C. One gram of the bis-benzonitrile palladium (II) was dissolved in 100 ml. benzene and allene was bubbled in for five minutes while the color changed from red-brown to yellow-green. The solution was permitted to stand for five minutes and the benzene solution was then evaporated (vacuum) to approximately 20 ml. and 100 ml. petroleum ether was added to precipitate the product which was filtered off, washed with petroleum ether and dried to 0.419 gram, M.P. (sinters) 180–185° C., and recrystallized from benzene-petroleum ether, M.P. (sinters) 184–187° C.

Analysis.—Calc'd. for C$_6$H$_8$Pd$_2$Cl$_4$: C, 16.58; H, 1.85; Cl, 32.62; Residue (as PdO), 56.31. Found: C, 17.73; H, 2.12; Cl, 32.22.

The di-μ-chloro-di-π-(β-chloroallyl)dipalladium (II) structure is confirmed by nuclear magnetic-resonance data as set forth in Table I below. The product of a similar preparation was recrystallized from benzene-heptane, M.P. 182–185° C. (sinters), and analyzed, C, 16.45; H, 2.14; Cl, 31.36; Residue (as PdO), 56.68.

Example 2

Allene and dichloro-bis-benzonitrile palladium (II) were added to benzene and additional of the palladium compound was then added, a total of 3.25 grams being employed, at a rate such that the solution was yellow (rather than the red-brown characteristic of the palladium compound in solution). Additional allene was then bubbled in to insure an excess. The solution was concentrated by evaporation on a steam bath and about 100 ml. petroleum ether was added to precipitate 1.89 grams of di-μ-chloro-π-(β-chloroallyl) - π' - (β-(3-chloro-1-propen-2-yl)-allyl)dipalladium (II), M.P. 150–152° C. (dec.) The product was recrystallized from benzene-heptane, M.P. 153–155° C.

Analysis.—Calc'd. for C$_9$H$_{12}$Cl$_4$Pd$_2$: C, 22.76; H, 2.55; Cl, 29.87; Residue (as PdO), 51.56. Found: C, 22.18; H, 2.54; Cl, 29.42; Residue, 51.90.

Example 3

A 0.541 mg. amount of PdCl$_2$·2H$_2$O was added to 25 ml. of benzonitrile and the resulting mixture heated at 100° C., until complete solution was achieved. The solution was cooled to room temperature and allene bubbled in to cause color change from red-brown to yellow-brown. A 150 ml. amount of petroleum ether was added to precipitate the product which was washed with petroleum ether and dried to 640 mg., three times recrystallized from benzene-heptane, M.P. 179–181° C., (decomposition).

Analysis.—Calc'd. for C$_{12}$H$_{16}$Cl$_4$Pd$_2$: C, 27.99; H, 3.13; Cl, 27.55; Residue (as PdO) 47.54. Found: C, 28.06; H, 3.22; Cl, 27.10; N, 0.00; Residue, 47.73.

The di-μ-chloro-di - π - (β-(3-chloro-1-propen-2-yl)-allyl)-dipalladium (II) structure was confirmed by nuclear magnetic resonance data as set forth in Table I below. The complex can be decomposed by pyrolysis to give 2,3-dichloromethylene-butadiene which is a polymerizable monomer, which can also be obtained by pyrolysis of the product of Example 2.

As illustrated by the examples above, adding the allene to the dichloro bis-aryl cyanide palladium (II) (in temporary excess) in benzene (or other aromatic or saturated aliphatic hydrocarbon solvent) results in a product in which both Y and Y' in the Formula I hereinabove are chloro, while addition of the same palladium (II) complex to excess allene in benzene (or other suitable hydrocarbon) results in the product represented by I in which Y is chloro while Y' is $$-\underset{\underset{CH_2Cl}{|}}{C}=CH_2$$

and reaction of the same palladium complex in benzonitrile (or other aryl cyanide) produces predominantly the compound represented by I when both Y and Y' are $$-\underset{\underset{CH_2Cl}{|}}{C}=CH_2$$

The tendency toward production of this third type compound is generally found with polar solvents, although some also cause substitution of other groups for the chloro groups. For example, when the reaction is conducted in lower alcohols, e.g., those of 1 to 6 carbon atoms, methanol, ethanol, propanol, isopropyl alcohol, butanol, amyl alcohols and hexanol, some or all of the chloro groups can be replaced by the respective alkoxyl groups, and similarly when the reaction is conducted in water, some or all of the chloro groups can be replaced by hydroxyl groups.

The new compounds of the present invention are those represented by the Formula I hereinabove in which Y and Y' are individually selected from the group consisting of halo, $$-\underset{\underset{CH_2\text{-halo}}{|}}{C}=CH_2$$

hydroxyl, alkoxyl, $$-\underset{\underset{CH_2-OH}{|}}{C}=CH_2 \quad , \quad -\underset{\underset{CH_2\text{-alkoxyl}}{|}}{C}=CH_2$$

in which the halo groups are selected from the group consisting of chloro, iodo and bromo, the alkoxyl group has 1 to 6 carbon atoms, and with the proviso that Y and Y' cannot both be halo groups. Novel compounds the same as the above except for the presence of sigma rather than π-bonding are obtained by dissolving the above compounds in dimethyl sulfoxide.

The processes of the present invention are generally conducted at about room temperature, although higher or lower temperatures can be employed if desired.

Nuclear magnetic resonance data for the products of the above examples is reported in Table I below, in which the positions of the various H's are as designated in the following formula:

The NMR data is presented as p.p.m. relative to a tetramethyl silane standard. Relative peak intensities are given in parentheses. A Varian Associates A-60 instrument was employed.

TABLE I

|  | $H_a$ | $H_b$ | $H_c$ | $H_d$ | $H_e$ | $H_f$ |
|---|---|---|---|---|---|---|
| $C_6H_8Cl_4Pd_2$: |  |  |  |  |  |  |
| In Dimethylsulfoxide | −4.57 | −4.57 |  |  |  |  |
| In Benzonitrile | −3.27(1) | −4.22(1) |  |  |  |  |
| $C_9H_{12}Cl_4Pd_2$: |  |  |  |  |  |  |
| In Dimethylsulfoxide | −4.56(2) | −4.56(2) | −3.78(2) | −3.78(2) | −6.03-6.21(1) | −4.85(1). |
| In Benzene | −2.30(2) | −3.79(v) | −2.41-2.46(2) | −3.79(v) | −4.87-5.04(2) | −3.79(v). |
| In Benzonitrile | −3.18(2) | −4.12(v) | −2.75(2) | −4.10(v) or 4.15(v) | −5.30-5.48(2) | −4.15(v) or −4.10. |
| $C_{12}H_{16}Pd_2$: In Dimethylsulfoxide |  |  | −4.07(2) | −4.07(2) | −6.04-6.21(1) | −4.86(1). |
| $[C_3H_5PdCl]_2$: |  |  | β-Hydrogen |  |  |  |
| In Dimethylsulfoxide | −4.37(4) | −4.37(4) | −6.30(1) (pentet) |  |  |  |
| In Benzene | −2.41(2)(w) | −3.57(2)(x) | −4.62(1) (heptet) |  |  |  |
| In Benzonitrile | −2.96(2)(y) | −4.01(2)(z) | −5.37(1) (heptet) |  |  |  |

Notes to table:
NMR data is presented as p.p.m. relative to a tetramethyl silane standard. Relative peak intensities in parentheses. Varian Associates A-60 instrument.
(v) Peaks unresolved, total relative intensity, 6.
(w) Doublet, J=12 cps.
(x) Doublet, J=7.5 cps.
(y) Doublet, J=12 cps.
(z) Doublet, J=7 cps.

The different results from the sigma bonding in dimethyl sulfoxide and π-bonding in other solvents are apparent.

The aryl cyanide serves as a complexing agent for the $PdCl_2$ in the present reaction and aryl cyanides in which the aryl group is hydrocarbon, e.g., containing ethyl, methyl or other lower alkyl substituents, or halo substituents, are generally suitable. The complex can be prepared as illustrated in M. S. Kharasch, R. C. Seyler and F. R. Mayo., J. Am. Chem. Soc., 60, 882 (1938).

The compounds produced according to the present invention can be used as oil additives, gasoline additives, anti-oxidants, catalysts, etc., as well as organic intermediates for production of other organic compounds. For example the products of the examples can be hydrolyzed to obtain saturated and unsaturated aldehydes, e.g., α-chloroacrolein, and α-chloropropionaldehyde from the product of Example 1, and the corresponding acrolein and propionaldehydes substituted with $$-\underset{\underset{CH_2Cl}{|}}{C}H=CH_2$$

groups in the α-position from the products of Examples 2 and 3. Similar aldehydes would be obtained by hydrolysis from other halo or the hydroxyl, or alkoxyl derivatives of the products except that the chloro groups in the aldehydes would be replaced by other halo or hydroxyl or alkoxyl groups.

What is claimed is:
1. Compounds selected from the group consisting of π-allylic complexes as illustrated by the formula:

in which Y and Y' are individually selected from the group consisting of halo, $$-\underset{\underset{CH_2\text{-halo}}{|}}{C}=CH_2$$

hydroxyl, alkoxy, $$-\underset{\underset{CH_2-OH}{|}}{C}=CH_2 \quad -\underset{\underset{CH_2\text{-alkoxyl}}{|}}{C}=CH_2$$

in which the halo groups are selected from the group consisting of chloro, iodo and bromo, the alkoxyl group has 1 to 6 carbon atoms, and with the proviso that Y and Y' cannot both be halo groups, and the sigma-bonded compounds dissolved in dimethylsulfoxide obtainable by dissolving the aforesaid π-allylic complexes in dimethylsulfoxide.

2. The compound di-μ-halo-π-(β-haloallyl)-π' - (β-(3-halo-1-propen-2-yl)-allyl)dipalladium (II).

3. The compound di-μ-halo-di-π-(β - (3-halo-1-propen-2-yl)-allyl)-dipalladium (II).

4. The compound di - μ - chloro-π-(β-chloroallyl)-π'-(β-(3-chloro-1-propen-2-yl)-allyl)dipalladium (II).

5. The compound di - μ - chloro-di-π-(β-(3-chloro-1-propen-2-yl)-allyl)-dipalladium (II).

6. The method of preparing allylic complexes of palladium which comprises contacting dihalo bis-arylcyanide palladium (II) with allene, in which the halo groups have an atomic weight greater than 19.

7. The method of preparing di-μ-halo-di-π-(β - haloallyl)dipalladium (II) which comprises adding allene to a hydrocarbon solution of dihalo bis-arylcyanide palladium (II) in which the halo groups are selected from the group consisting of bromo, iodo and chloro groups.

8. The method of preparing di-μ-halo-π-(β-haloallyl)-π'-(β-(3-halo-1-propen - 2 - yl)-allyl) dipalladium (II) which comprises adding dihalo bis-arylcyanide palladium (II) to allene in hydrocarbon solution in which the halo groups are selected from the group consisting of bromo, iodo and chloro groups.

9. The method of preparing di-μ-halo-di-π-(β - (3-halo-1-propen-2-yl)-allyl) dipalladium (II) which comprises contacting dihalo bis-arylcyanide palladium (II) with allene in arylcyanide solvent in which the halo groups are selected from the group consisting of bromo, iodo and chloro groups.

10. The method of preparing di - μ-chloro-di-π-(β-chloroallyl)dipalladium (II) which comprises adding allene to a benzene solution of dichloro bis-benzonitrile palladium (II).

11. The method of preparing di-μ-chloro-π-(β-chloroallyl)-π'-(β-(3-chloro-1-propen-2 - yl) - allyl)dipalladium (II) which comprises adding dichloro bis-benzonitrile palladium (II) to allene in benzene solution.

References Cited

Chien et al.: Chemistry and Industry (London), June 3, 1961, pages 745–6.

Shaw: Chemistry and Industry (London), June 30, 1962, page 1190.

HELEN M. McCARTHY, *Primary Examiner.*

TOBIAS E. LEVOW, *Examiner.*

A. P. DEMERS, *Assistant Examiner.*